July 28, 1931.   E. W. BOYER   1,815,964

CHICK FEEDER

Filed March 27, 1928

Inventor
*Edwin W. Boyer*

By
Attorney

Patented July 28, 1931

1,815,964

UNITED STATES PATENT OFFICE

EDWIN W. BOYER, OF THORNTOWN, INDIANA

CHICK FEEDER

Application filed March 27, 1928. Serial No. 265,004.

My invention relates to feeders for poultry commonly termed "buttermilk" feeders but the invention contemplates a device of this character susceptible to various other uses to which the device may be adapted, and it is an object of the invention to provide a simple and inexpensive construction which may be easily kept sanitary and which may be easily taken apart for refilling, all as will be hereinafter more particularly described and claimed.

Figure 1:
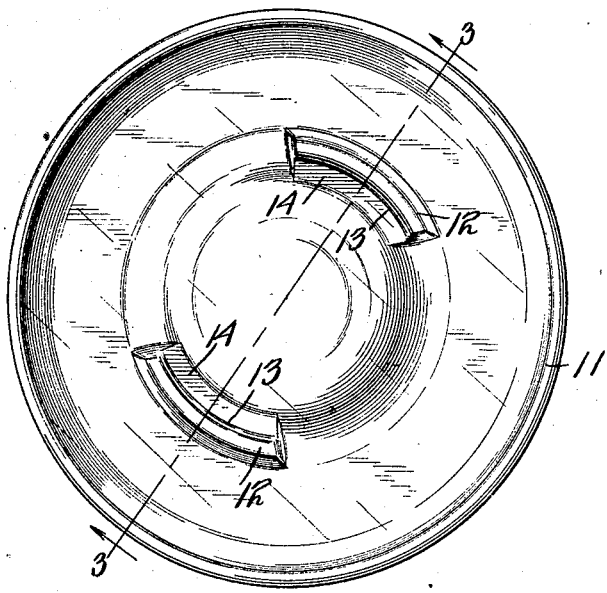
Figure 2:
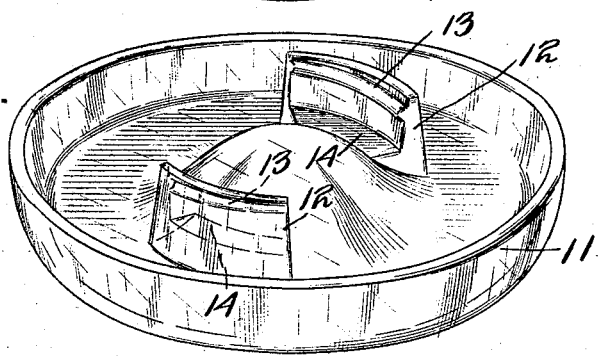
Figure 3:
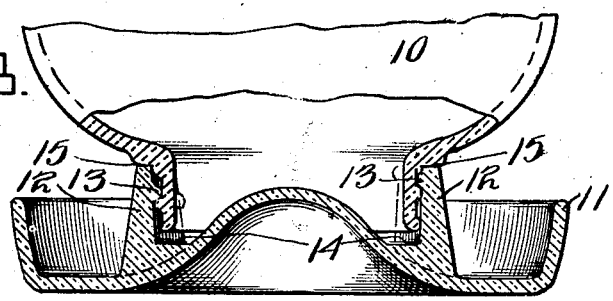

Referring to the accompanying drawings which are made a part hereof and on which similar reference characters indicate similar parts, Figure 1 is a top plan view of a base or trough illustrating one application of my invention, Figure 2, a perspective of the same, and Figure 3, a section on the line 3—3 of Figure 1 with a container for the food substance attached thereto.

In the drawings reference character 10 indicates a container which may be a conventional fruit jar, or if a larger container is desired, any type desired may be used which has a mouth of the general construction shown.

A base or trough 11 of saucer-like formation or a relatively shallow receptacle having an upturned rim or flange about its periphery is provided to afford poultry free access to food stuff supplied from the container 10. The center of the base is convexly curved in order to direct the food stuff outwardly towards the periphery of the receptacle. On diametrically opposite sides of this center are located integrally formed upstanding flanges 12 curved in the form of segments of a circle for receiving the circular mouth of the jar or container 10. It will be understood of course that the invention contemplates the employment of flanges which are formed complementarily with the mouth of the receptacle to be supported.

The flanges 12 are provided on their inner faces with ribs 13 which serve substantially as screw threads which engage and mesh or mate with screw threads on the exterior of the mouth of the container 10. These upstanding flanges 12 are formed of sufficient thickness to permit the glass to be ground away on their insides to form the ribs 13. In lieu of grinding, the glass can be cut away by sand blasting or the like, or in lieu of the above, the segmental ribs which are the equivalent of threads may be produced in any other desired manner, as by molding or by forming of plastic composition secured thereon in any desired manner to provide the necessary threads required to secure the union between the parts. The upstanding flanges 12 are provided with flat faces 14 on the interior at the base and the flat extremities 15 which serve as abutments against which the top of the neck of the container 10 and the shoulder surrounding said neck may rest when the parts are assembled in order to form a proper support for the same.

In use the vessel or container 10 is filled, or partly filled, with buttermilk or other substance which it is desired to feed to the poultry, and the base 11 is then screwed onto the top thereof to form a union, as shown in Figure 3. The vessel is then inverted, and the feeder thus constructed placed so that it will rest upon the base 11. The buttermilk or other food substance in the container will flow out through the narrow opening between the edge of the neck of the vessel and the top surface of the base, at the points between the upstanding flanges 12, into the saucer-like or trough-like portion of the base between its upwardly curved center and the flange which surrounds its edge. The poultry feed around the base, and as the food is consumed, more flows through the narrow space indicated, so that it is supplied substantially as needed to take care of the consumption. In this way the main body of the food substance is at all times protected in the container, and kept in a healthful and sanitary condition, as is also the feeding trough or saucer from which the poultry consume it. By separating the parts, the container and base may be quickly and readily cleaned, and both parts being of glass, the cleaning process is facilitated, and a sanitary article of this character is thus provided, which will be found very convenient and satisfactory, in use.

It will be obvious to those skilled in the art that various changes may be made in my device without departing from the spirit of the invention, and I, therefore, do not limit myself to what is shown in the drawings and described in the specification, but only as set forth in the appended claims.

Having thus fully described my said invention what I claim as new and desire to secure by Letters Patent is:

The combination of a container and a receptacle, the receptacle having an upturned rim for receiving foodstuffs from a food supply in the container, said receptacle having a convex central portion extending upwardly into the container and upstanding lugs integral with the receptacle on opposite sides of and between said convex portion and the upturned rim for engaging the container, fastening means on the inner faces of the upstanding lugs, the container having cooperating means to engage the fastening means on the lugs for holding the parts together and providing an unobstructed passage from the container to the receptacle on two sides of the container, substantially as set forth.

In witness whereof, I have hereunto set my hand at Indianapolis, Indiana, this 19th day of March, A. D. nineteen hundred and twenty-eight.

EDWIN W. BOYER.